(12) United States Patent
Albornoz et al.

(10) Patent No.: US 7,305,557 B2
(45) Date of Patent: Dec. 4, 2007

(54) MANAGEMENT AND RECOVERY OF DATA OBJECT ANNOTATIONS USING DIGITAL FINGERPRINTING

(75) Inventors: Jordi Albornoz, Arlington, MA (US); Lee D. Feigenbaum, Brookline, MA (US); Sean J. Martin, Boston, MA (US); Simon L. Martin, Gnosall (GB); Lonnie A. McCullough, Boston, MA (US); Elias Torres, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 10/600,316

(22) Filed: Jun. 20, 2003

(65) Prior Publication Data

US 2004/0260929 A1    Dec. 23, 2004

(51) Int. Cl.
*H04L 9/00* (2006.01)
(52) U.S. Cl. ...................... 713/176; 713/165
(58) Field of Classification Search ............... 713/176, 713/160, 165; 715/512; 707/5
See application file for complete search history.

(56) References Cited

U.S. PATENT DOCUMENTS

| | | | | |
|---|---|---|---|---|
| 5,787,175 A | * | 7/1998 | Carter | 713/165 |
| 6,011,847 A | * | 1/2000 | Follendore, III | 713/160 |
| 6,519,603 B1 | | 2/2003 | Bays et al. | 707/102 |
| 6,546,405 B2 | * | 4/2003 | Gupta et al. | 715/512 |
| 7,143,091 B2 | * | 11/2006 | Charnock et al. | 707/5 |

FOREIGN PATENT DOCUMENTS

EP    0 984 371 A2 *    3/1999
WO   WO 03/042867 A1    5/2003

OTHER PUBLICATIONS

"Digital Signatures: How They Work" J. Prosise, PC Magazine, Apr. 9, 1996.
eDataMatrix's RecordDNA Digital Fingerprinting, Real Time Knowledge Management for Global Interprises, 3rd Quarter 2002.
D. Chamberlin, "Normalization" A Complete Guide to DB2 Universal Database, 1998, pp. 99-103.

* cited by examiner

*Primary Examiner*—Kim Vu
*Assistant Examiner*—Nirav Patel
(74) *Attorney, Agent, or Firm*—John E. Campbell

(57) ABSTRACT

Digital Fingerprints are generated for data objects in a system where separate annotation files are created for data objects. This permits cross heterogeneous system relationship of a data object with associated annotations. The digital fingerprint is saved in an annotation store along with a first relationship between the digital fingerprint and the location of annotations as well as a second relationship between the digital fingerprint and location of copies of the data object. The digital fingerprint can be generated by any system that has a copy of the data object. Annotations or data objects can be found by searching for the digital fingerprint and its relationships.

12 Claims, 19 Drawing Sheets

F= (L1)
L1=file_server\articles\article.pdf
L2=file_server\articles\top10\article3.pdf

US 7,305,557 B2

MANAGEMENT AND RECOVERY OF DATA OBJECT ANNOTATIONS USING DIGITAL FINGERPRINTING

FIELD OF THE INVENTION

The present invention is related to computer data handling. It is more particularly related to managing and annotating digital data objects.

BACKGROUND OF THE INVENTION

An annotation system is one where descriptive information is stored about objects, or parts of objects, without modifying the objects themselves. Annotation systems exist in which annotations are stored in the data stream of the target objects themselves. Such systems have many disadvantages. In a preferred annotation system, annotations are stored separate from the target data source. This provides a great deal of flexibility in managing the data source and its associated annotations. The separate annotation store system is the subject of the present invention and will be referred to as simply the "annotation store" herein. Annotation systems are in high demand in Life Sciences and biotech, but not limited solely to that domain.

An annotation store, typically a database, contains the descriptive information for the annotation. An indexing scheme is used to map each annotation to the target object or the position within the target object. We refer to the objects (collections of bytes of data) that are potential targets for annotations as "data sources". Annotation systems can have client components ranging from a standalone annotation program to annotation plug-ins that integrate with third party vendor software.

Digital fingerprints are described in "Digital Signatures: How They Work" in Apr. 9, 1996 PC Magazine. A digital fingerprint is a computable identifier for a given set of bytes. Desirable properties of a digital fingerprint include conciseness (for ease of storage and transmission), uniqueness (to avoid different sets of bytes having the same fingerprint), determinism (the same fingerprint should always be computed for the same set of bytes), and ease of computation (to facilitate quick computation of a large number of fingerprints). One popular example of a digital fingerprint is the MD5 hash algorithm, which calculates a 128-byte digital fingerprint for a given collection of bytes.

An annotation is referred to as "lost" when it is not able to be retrieved by a user working with the data source to which the annotation is targeted. A data source is referred to as "lost" when it is not able to be recovered by a user who has retrieved an annotation on that data source via an external process, such as an annotation search or an annotation browser.

In example prior art annotation systems (FIG. 4), the following procedures are used in creating, storing, and retrieving an annotation: First, a user 401 retrieves and opens 402 the target data source, "DS", from a location 405, "L". Examples of "L" include a network location (e.g. Internet URL "intranet.server.com/files/my_spreadsheet.xls"), a local path (e.g. "c:\data\article20a.pdf"), or a content-management identifier (e.g. "MyCMS:Store:98a021"). The user then creates the annotation 403, "A", by entering the information that comprises "A". The annotation store 407 records the relationship between "A" and "L" 404. If the user creates another annotation, "A2" on the data source from "L", then a relationship between "A2" and "L" will also be recorded in the annotation store. Thus, there is a many-to-one relationship between annotations and data-source locations within the annotation store.

Referring to prior art FIG. 5, when a user 501 later opens 503 "DS" from location "L" 405, the annotation store 406 is queried for all annotations associated with "L". In the above scenario, both "A" and "A2" 505 would be returned 504, and the user can work with the annotations and their target data source.

Referencing prior art FIG. 6, a user 601 may access "A" or "A2" using an external mechanism, such as an annotation search 603 or browser interface. In this case, the annotation store 605 is queried for the location at which the target data source can be found. Because "A" (or "A2") is related to "L1", "L1" is returned to the user and, once more, the user can work with both the annotation and its target data source.

The traditional annotation system, examples shown in prior art FIGS. 4-6, has many shortcomings. For example, referring to prior art FIG. 7, consider the case in which "DS" is accessed from a location other than "L". (For example, this might occur if a second user sends "DS" as an email attachment to a user 706). Thus we have the case of a user 706 accessing "DS" from a new location, "L2". When the annotation store 705 is queried 704 for all annotations related to "L2", nothing is returned, and the annotations "A" and "A2" are lost.

A second shortcoming example (prior art FIG. 8) involves scenarios in which the user 804 accesses the annotation "A" through an external search 805 or browser mechanism and attempts to locate the target data source "DS". As before, the annotation store returns location "L", but if "DS" no longer exists at "L" (for example, if a local copy of an article was annotated prior to the article being moved 802 to a content-management system 803), then "DS" will be lost.

SUMMARY OF THE INVENTION

The present invention provides a system whereby a digital fingerprint ("DF") is generated for a data source. The "DF" is related to the data source and also to any annotation objects that relate to the data source. A Digital Fingerprint of the data source is unique to the data source from which it was created. Therefore, a search on a "DF" has the same function as a search on the data source it represents. Now, the relationship of an annotation to its data source is made independent from the location of the data source. In a preferred embodiment, each copy of a data source or its annotations is related to a single digital fingerprint value.

It is therefore an object of the invention to use digital fingerprints to identify a target data source within an annotation system.

It is another object of the present invention to provide a one-to-many relationship between a digital fingerprint and the location(s) at which a target data source may be found.

It is yet another object of the present invention to provide an on-demand search process that locates a lost data source with a given digital fingerprint.

It is still a further object of the present invention to provide a continual search to locate and digitally fingerprint documents outside of the control of an annotation system.

Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE PREFERRED EMBODIMENTS

Figure 1:
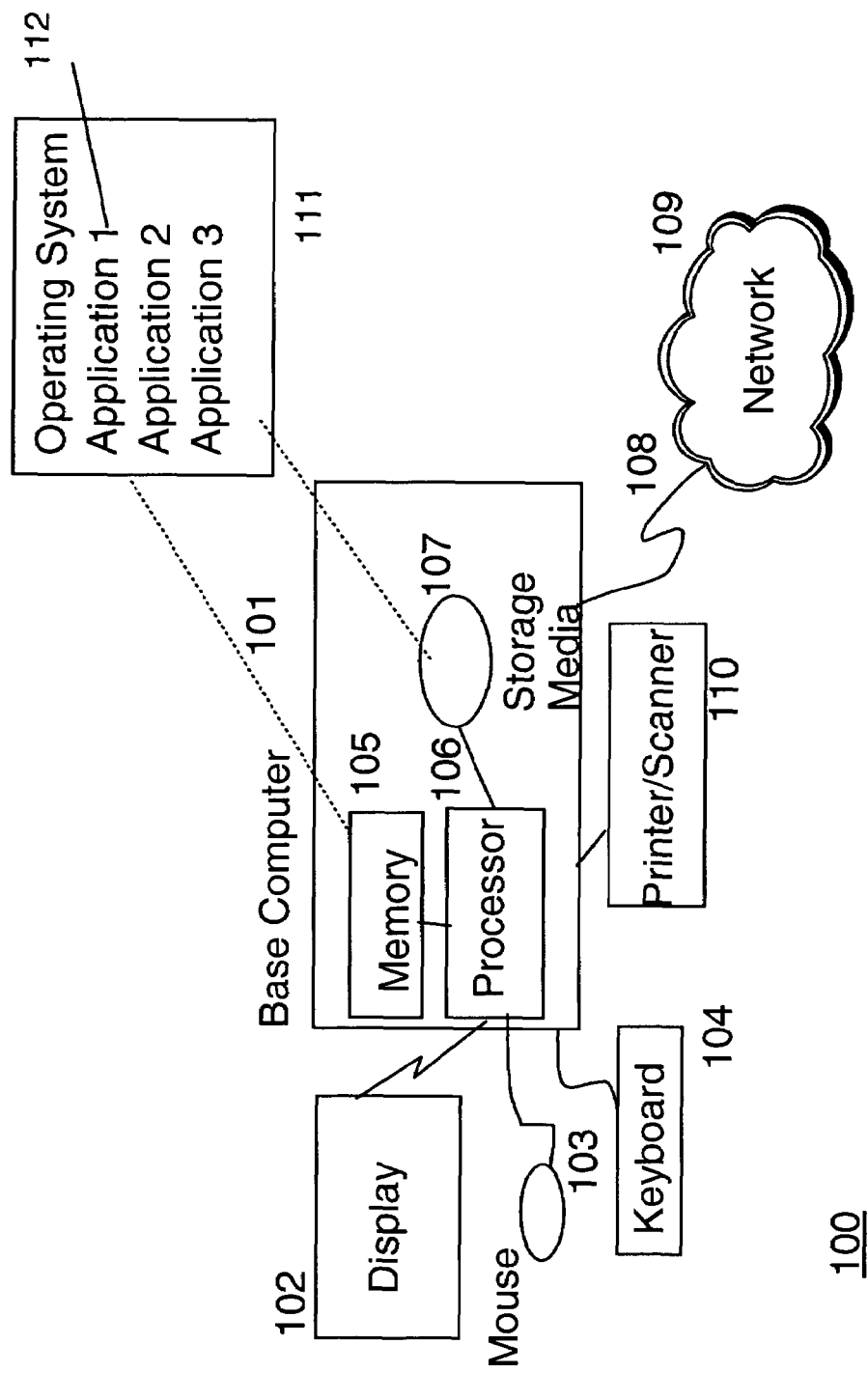
FIG. 1 is a diagram depicting components of a computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
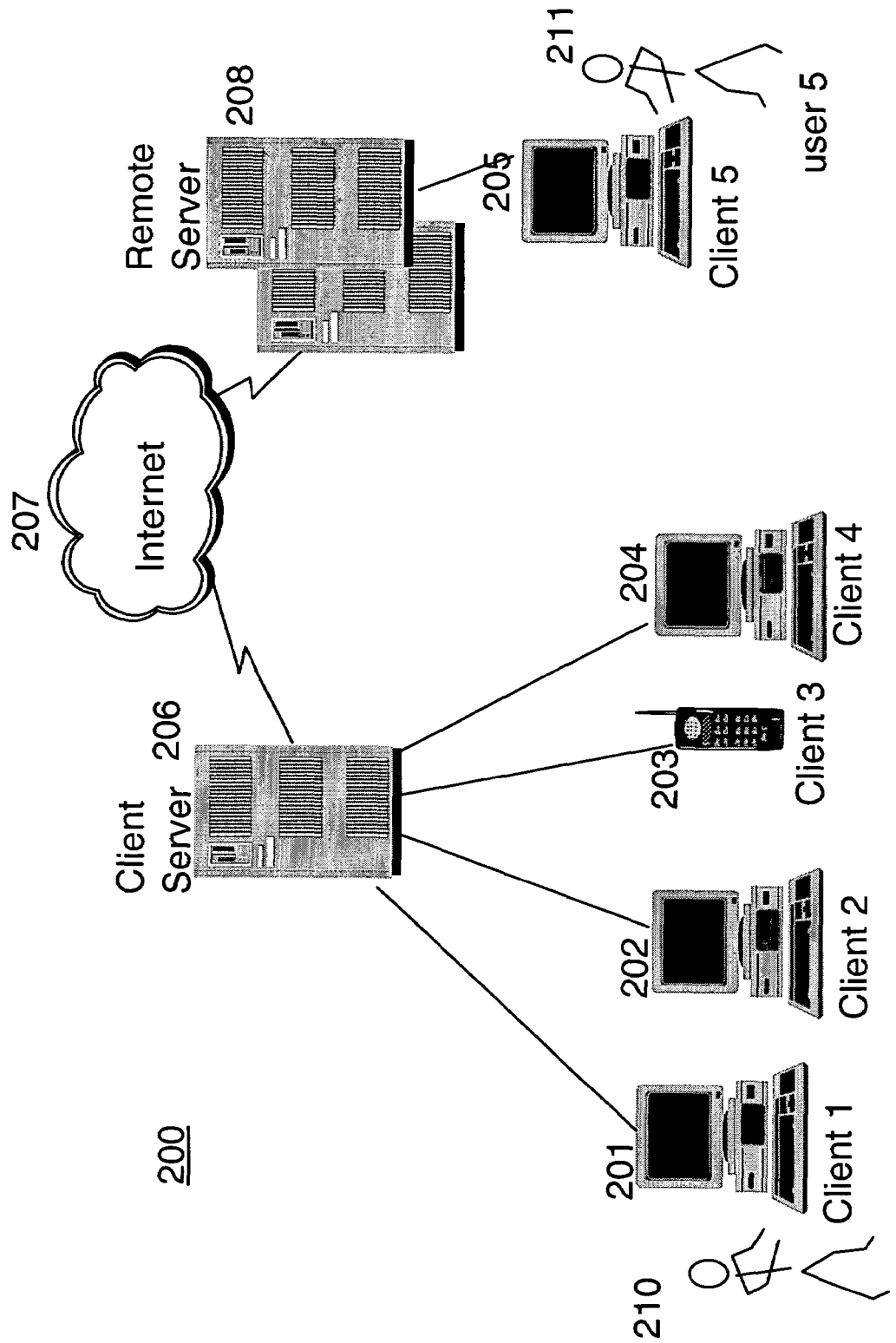
FIG. 2 is a diagram depicting a network of computer systems.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zServer 900 Server available from IBM.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

U.S. Pat. No. 6,519,603 "Method and system for organizing an annotation structure and for querying data and annotations" assigned to IBM presents a method and system for capturing annotations about database material in a way that allows queries with predicates or conditions on both the database material and the annotations and is incorporated herein by reference.

Figure 3:
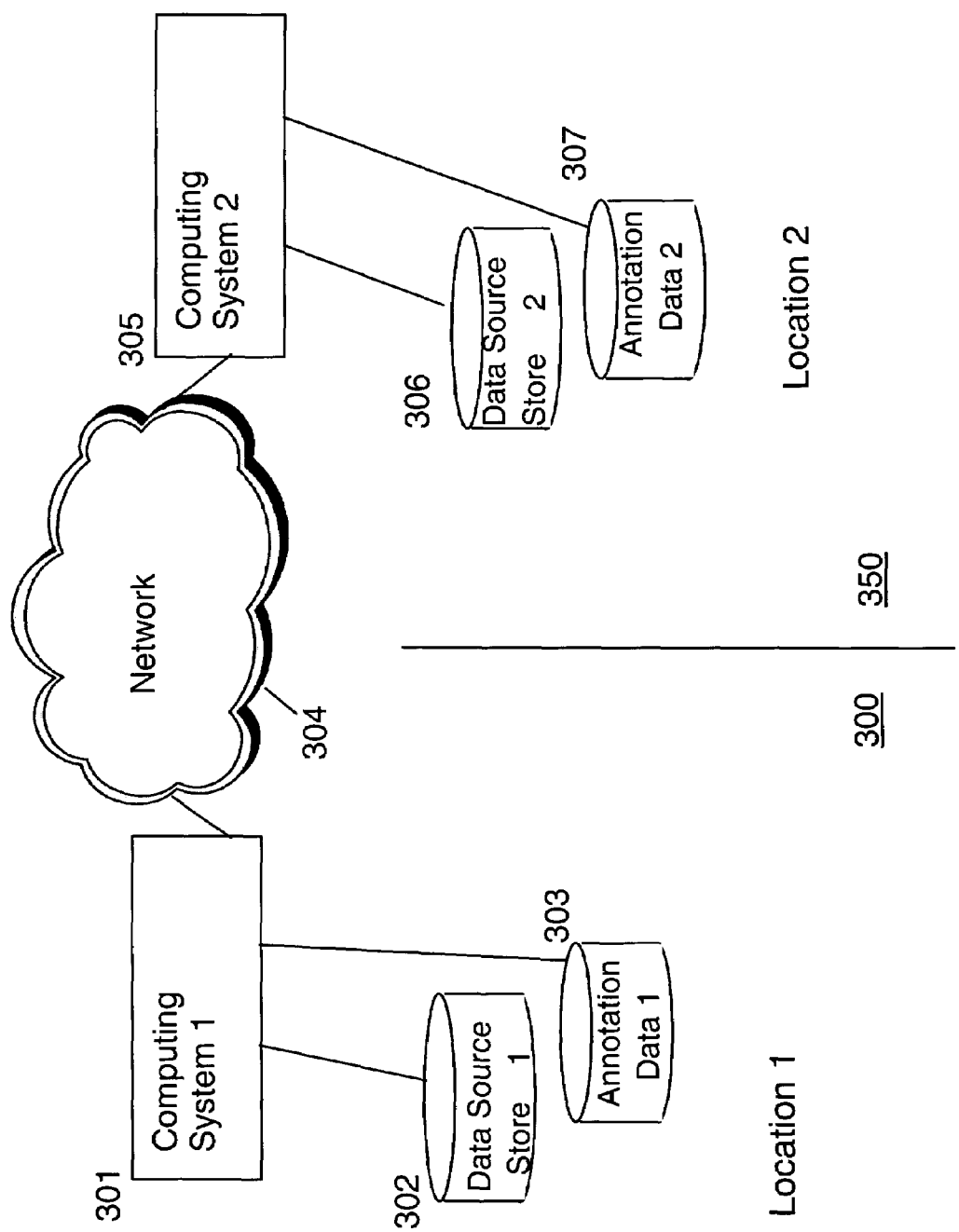
FIG. 3 is a depiction of annotation databases.
Figure 4:
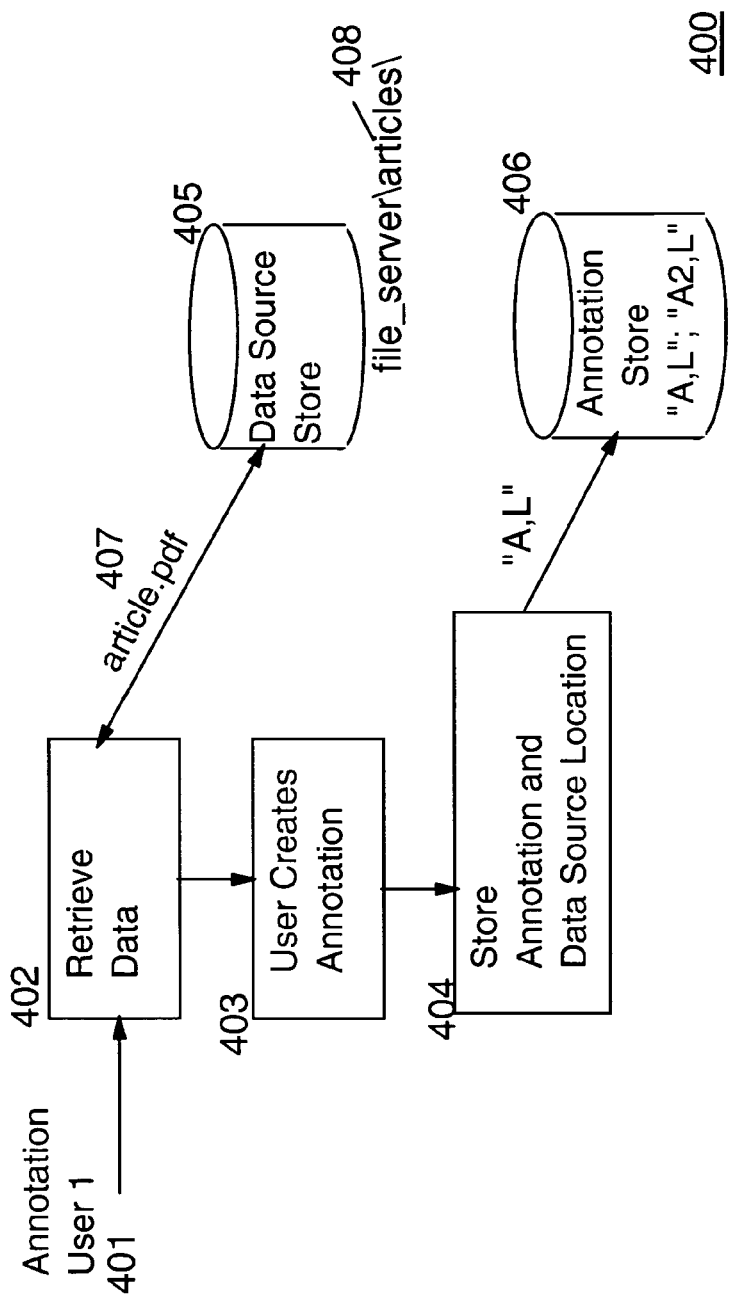
FIG. 4 prior art is an illustration of creating annotations.
Figure 5:
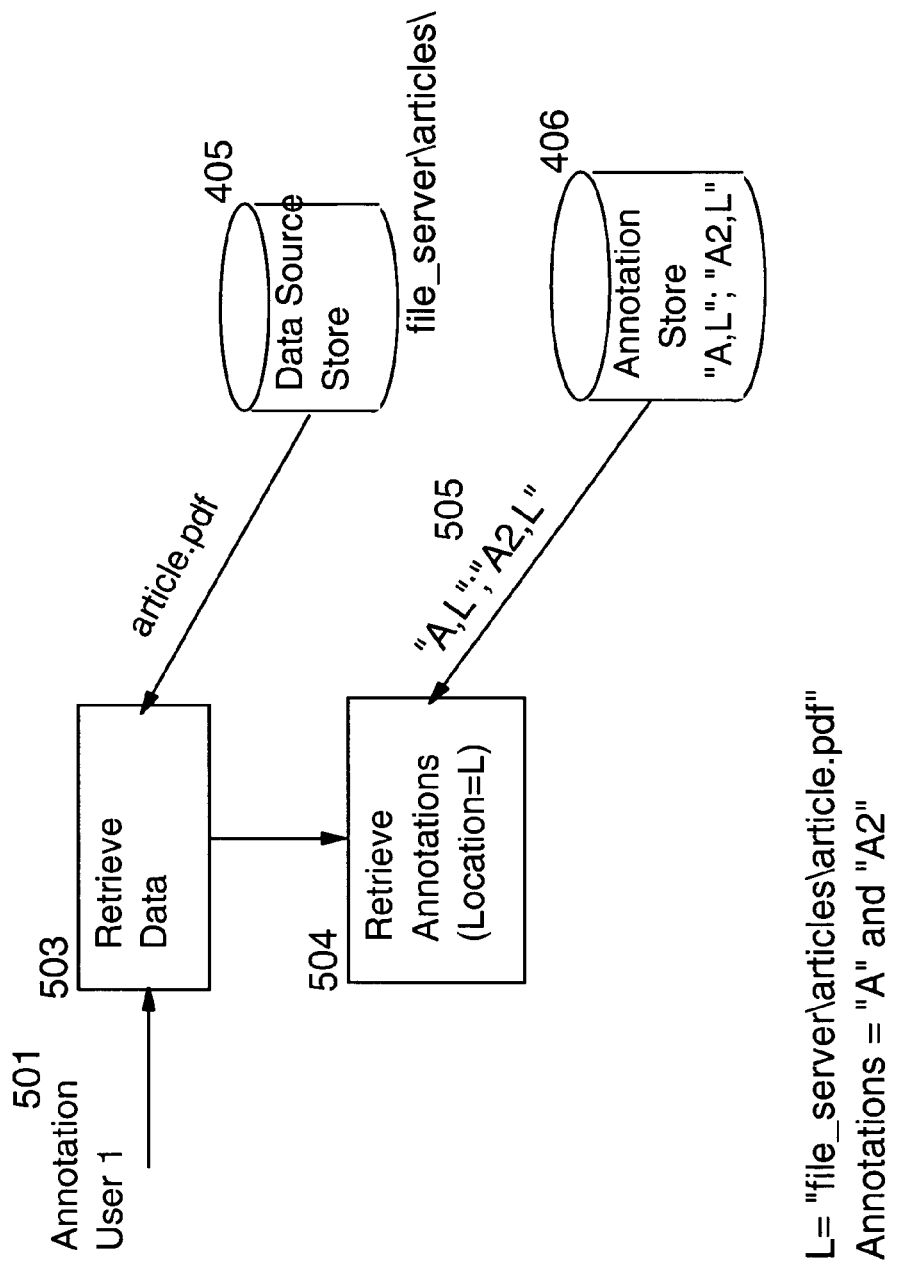
FIG. 5 prior art is an illustration of retrieving annotations for a data source.
Figure 6:
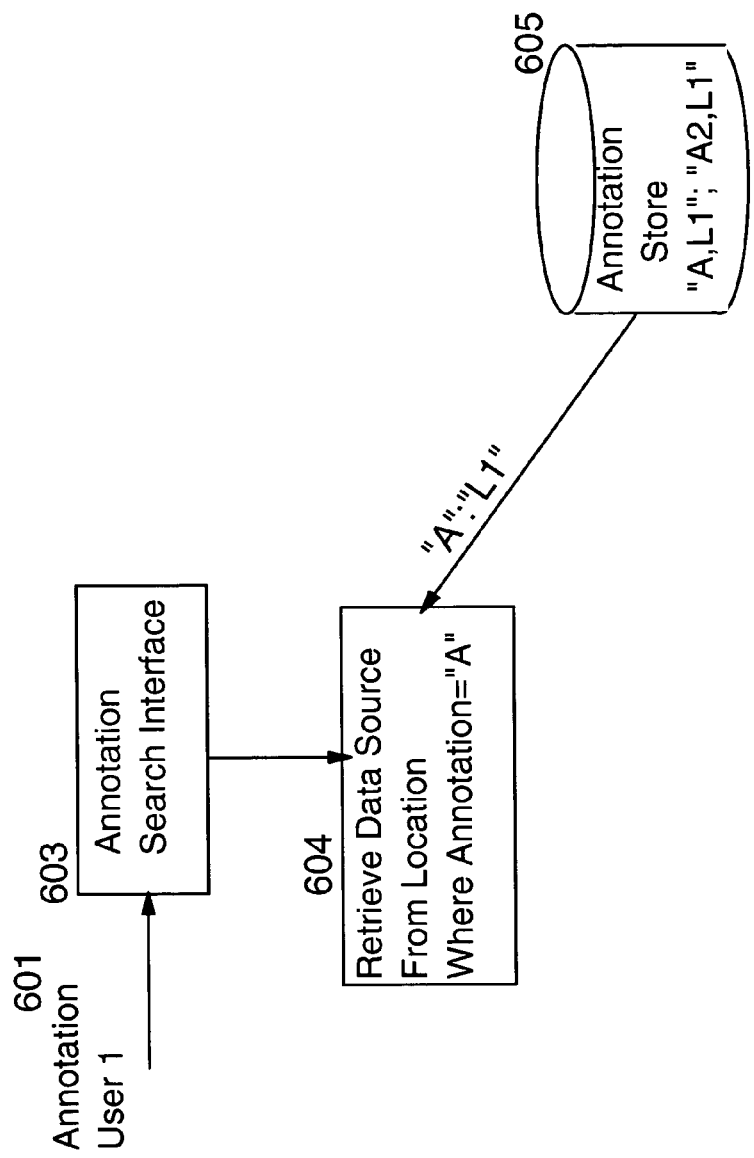
FIG. 6 prior art illustrates retrieving a data source for a given annotation.
Figure 7:
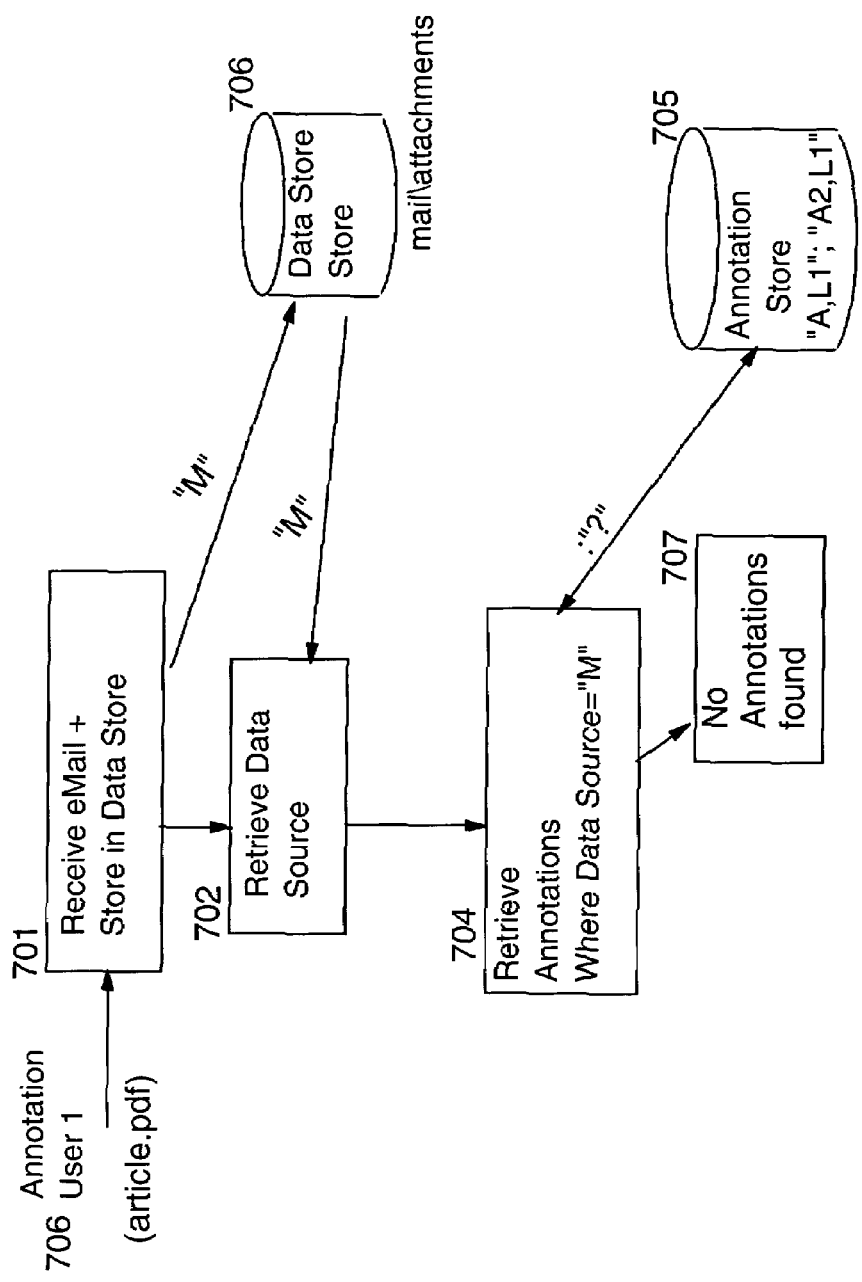
FIG. 7 prior art illustrates lost annotations.
Figure 8:
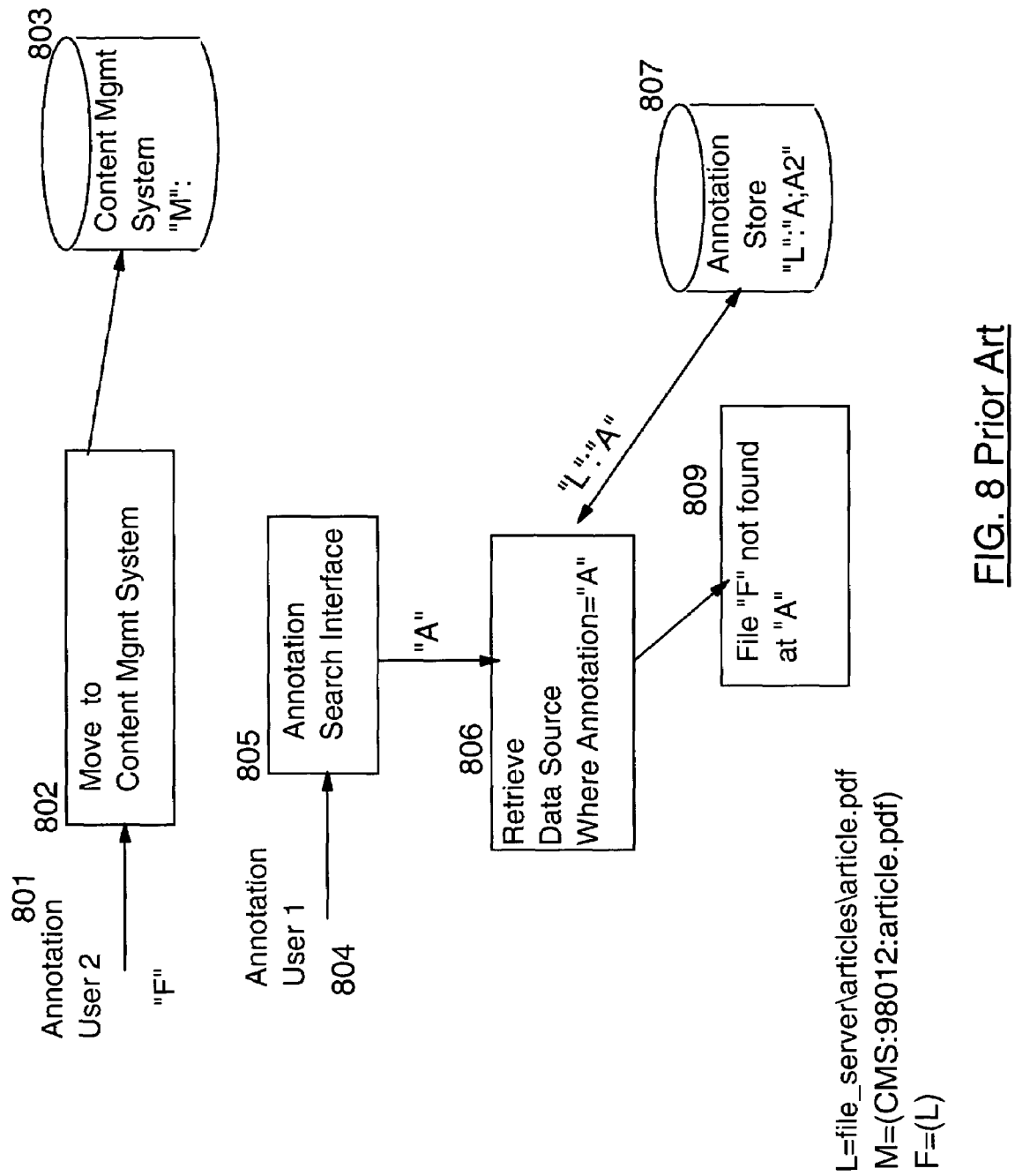
FIG. 8 prior art illustrates lost data source in an annotation system.

The present invention introduces a digital fingerprint of target data sources to improve upon traditional annotation systems. Referring to FIG. 3, an annotation system in a preferred embodiment extends across multiple computing systems 301 305 and communicate by way of a network 304 such as the internet for example. A first system 300 at Location 1 has a local data source 1 302 and a local annotation store 1 303. A second system 350 at location 2, has a local data source 2 306 and a local annotation store 2 307. Annotation data for a data source is related across the systems by use of the digital fingerprinting of the data source as taught in the present invention.

Digital fingerprint algorithms comprise methods to encode the data file into a small string of characters. The small string preferably is unique to the data file, however the degree of uniqueness required of an algorithm is a system requirement. A digital fingerprint can by created by using any one of a checksum algorithm, a cyclic redundancy check, a hash algorithm, the SHA-256 secure hash algorithm, the SHA-1 secure hash algorithm or the MD5 message digest algorithm. Each of these algorithms has a different degree of uniqueness and requires a different degree of programming overhead to perform. The use of algorithm for producing a digital fingerprint is consistent with the present invention and practically, may require added checking to assure the digital fingerprinted object is the required object. Methods of verifying the object are known in the art and would also depend on the system using them.

According to the invention, when a user retrieve a data source "DS" from location "L" for annotating, the annotation system generates a digital fingerprint "DF" for the data source. In one embodiment of the system, "DF" is generated by calculating the MD5 hash of the bytes that comprise "DS". In an alternative embodiment of the system, only relevant portions of "DS" may contribute to the fingerprint. For example, a timestamp unrelated to the main content of "DS" may be excluded from a digital fingerprint.

In another example, the DS may be compressed as a GIF file or encrypted as an encrypted file, an embodiment may create the fingerprint on the compressed file or decompress (or decrypt) the file to create the fingerprint. In yet another embodiment, an application may hash other data along with the data source file to create a personalized digital fingerprint. For example, a hospital may add a string representing that hospital to the digital fingerprinting event along with the file string that is being digitally fingerprinted. This would add a level of security as well as separate files that may be duplicated for other reasons.

Figure 9:
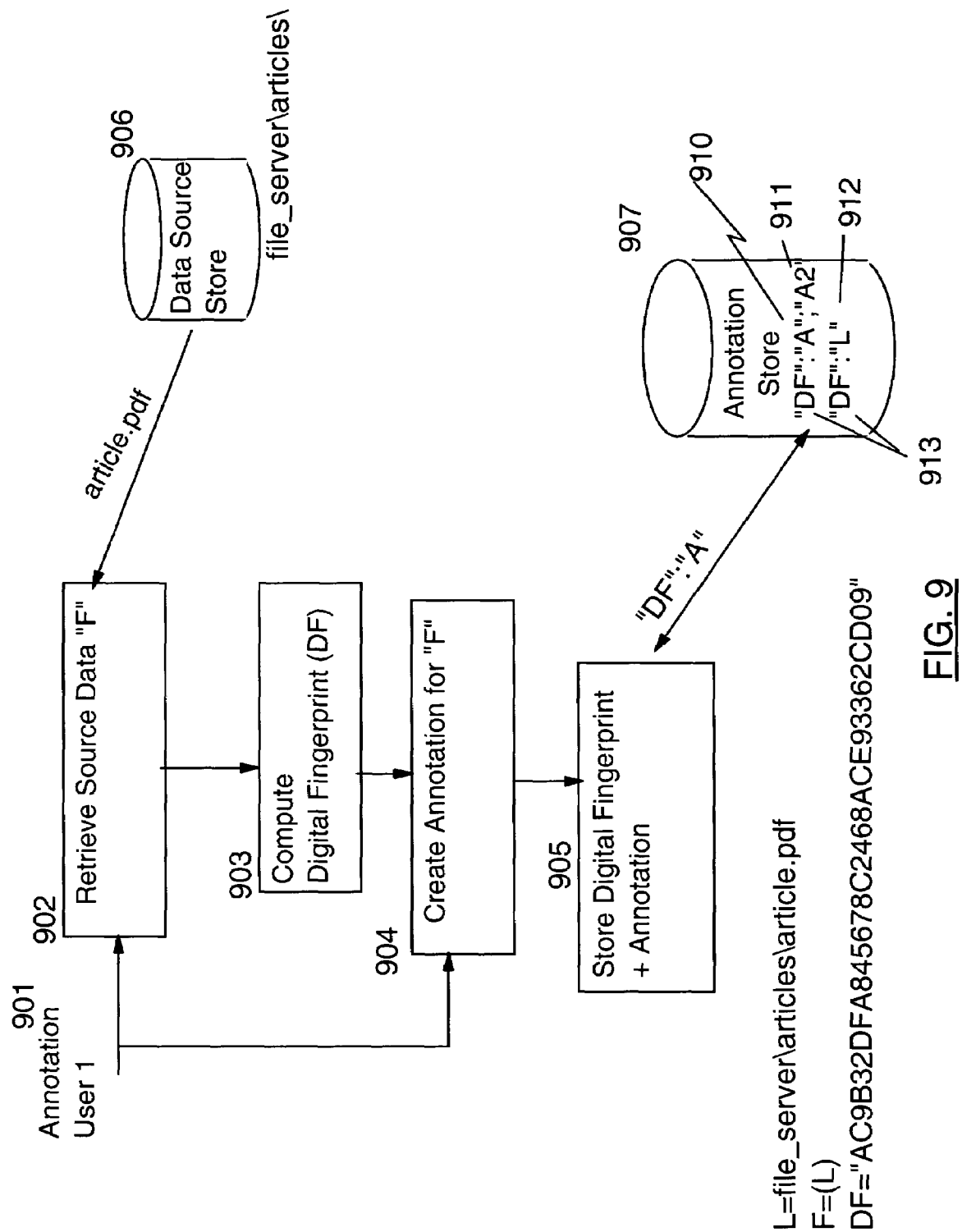
FIG. 9 illustrates creating an annotation using digital fingerprints.

Referencing FIG. 9, when the user 901 creates an annotation 904 "A" 910 using an object creator program, the annotation system now records 905 a relationship between "A" 910 and "DF" created by a second creator program, and between "DF" 913 and "L" 912. If a second annotation, "A2" 911, is created by a third creator program on "DS" at the same location, a relationship (created by a fourth creator program) between "A2" 911 and "DF" is recorded (by a second saver program) by the annotation store 907 by a saver program. (The relationship between "DF" and "L" remains unchanged. The relationship was created by a first creator program.) Thus there is a many-to-one relationship between annotations 910-911 and data-source digital fingerprints 913.

Figure 10:
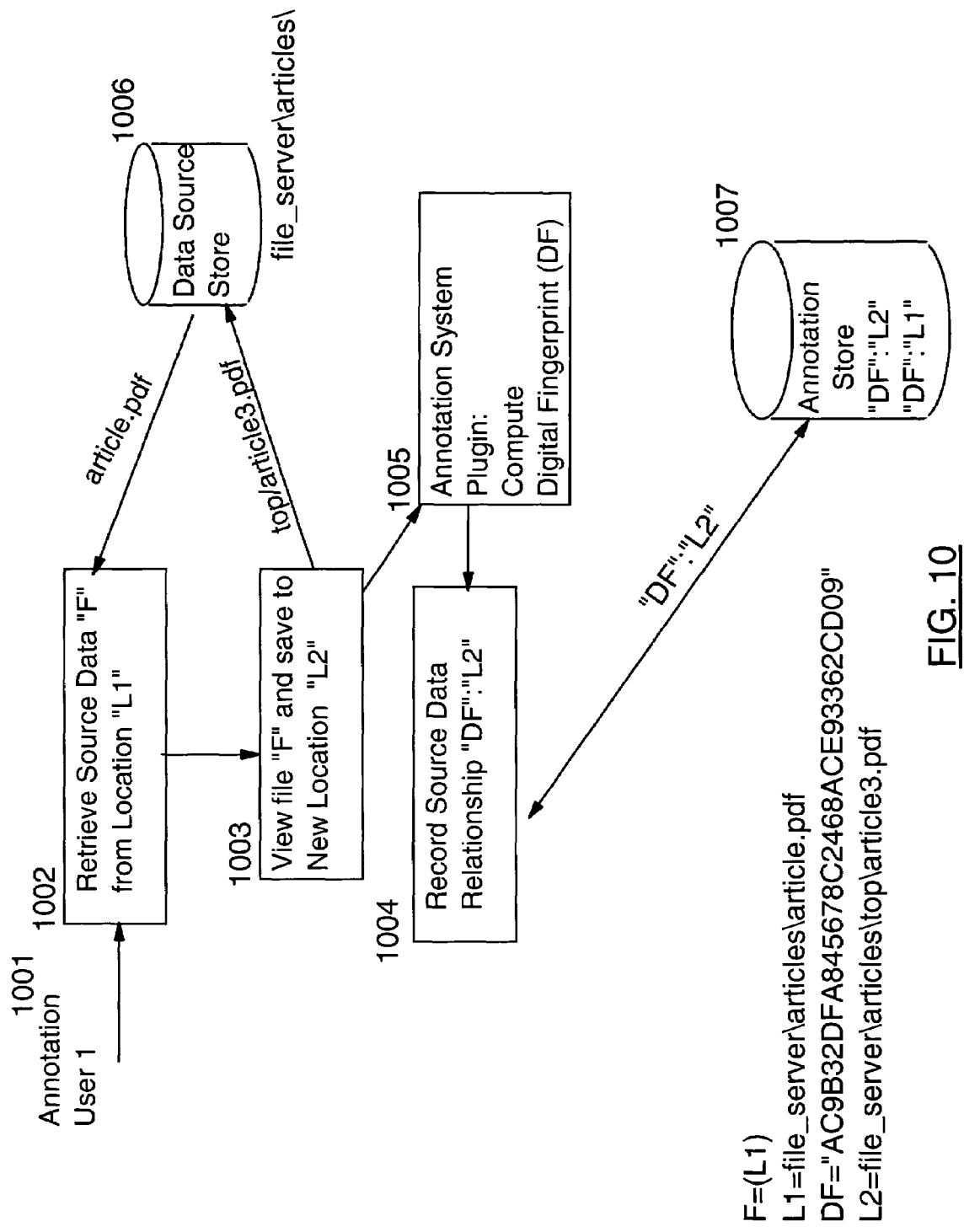
FIG. 10 illustrates an annotation system plug-in for associating digital fingerprints with new data source locations.

In one embodiment of the system, the client components of the annotation system monitor data movement to determine when a data source moves to a new location. For example (FIG. 10), an annotation application plug-in 1005 observes a user 1001 having retrieved a data source 1002 and viewing it in a document reader application such as the Acrobat Reader from Adobe, invoking the "Save as . . . " command to copy 1003 a data source with fingerprint "DF" from location "L1" to location "L2". The plug-in reports this to the annotation store 1007, which then records the relationship between "DF" and "L2" 1004. Thus, the relationship between digital fingerprints and locations becomes one-to-many.

Figure 11:
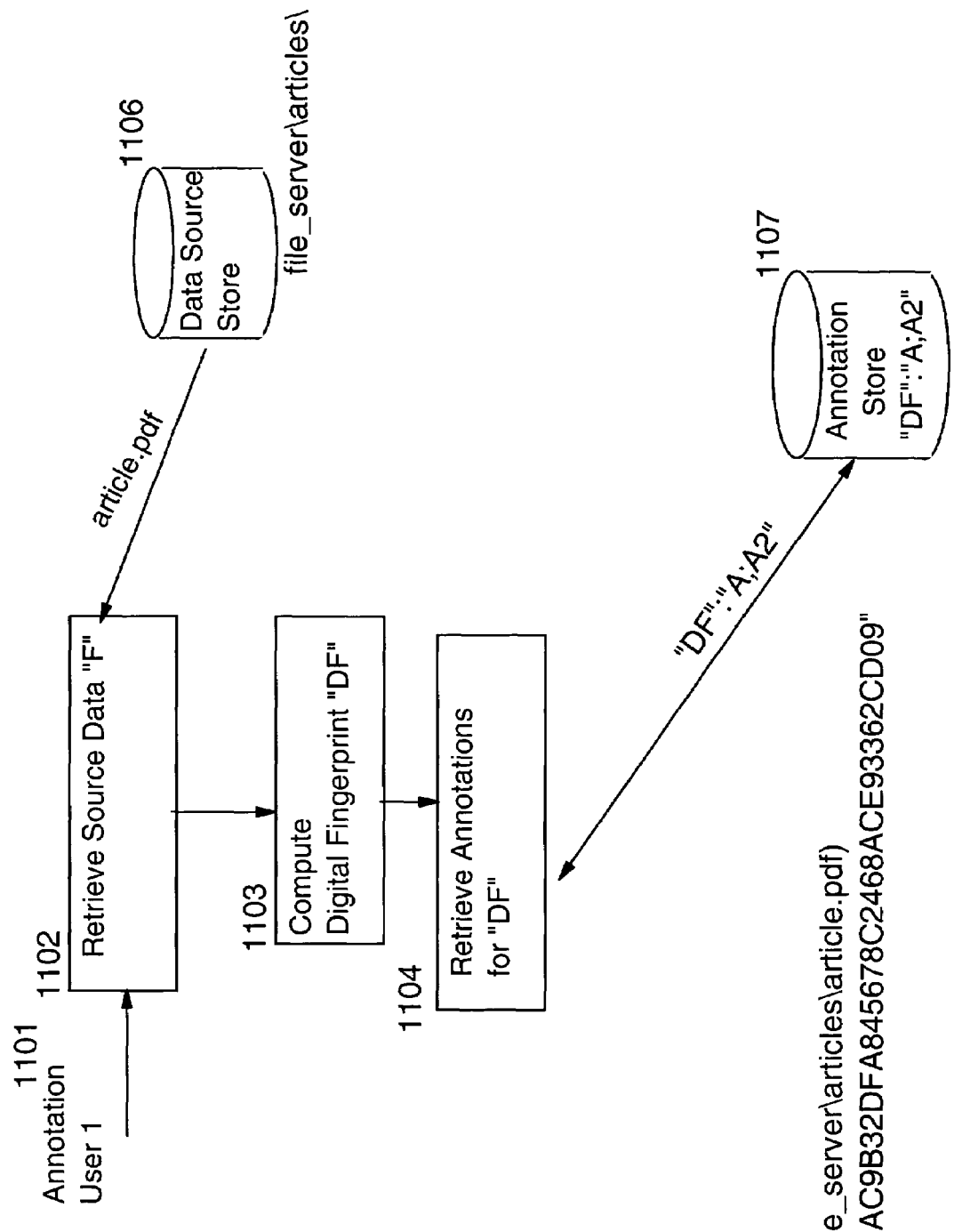
FIG. 11 illustrates retrieving annotations via digital fingerprint when given a data source.

In one embodiment of the system, FIG. 11, the user 1101 later opens "DS" 1102 from location "L" 1106 and the system calculates the fingerprint "DF" 1103 using a value creator program. It queries the annotation store 1107 for all annotations associated with "DF" and the store 1107 uses the fingerprint to locate and return "A" and "A2". The user can now work with both the annotations and the target data source, as in the traditional annotation system.

Figure 12:
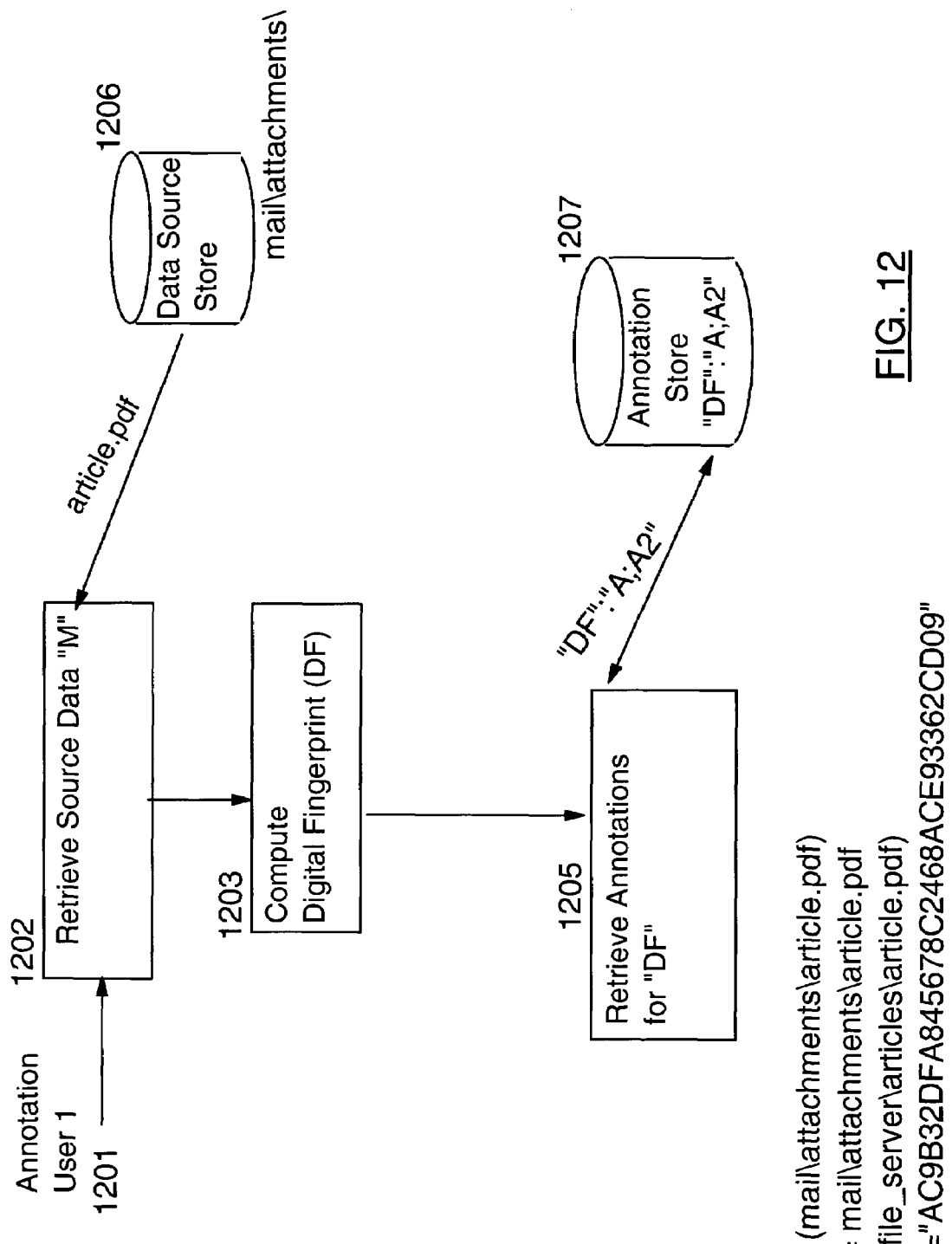
FIG. 12 illustrates retrieving otherwise lost annotations via digital fingerprint when given a data source from a new location.

In another embodiment of the system, FIG. 12, a second user sends "DS" to another user 1201 (for example, via an email attachment) who then opens it 1202 from a new location 1206, "L2". The system again calculates the fingerprint "DF" 1203 and queries 1205 the annotation store 1207 based on this fingerprint. The store uses the many-to-one annotation-to-fingerprint relationship and returns annotations "A" and "A2". The user can now work with both the annotations and the target data source despite the fact that "DS" is being accessed from "L2" while the annotations were created from "L1". Thus, a shortcoming of a traditional annotation system is eliminated by digital fingerprints according to the invention, which allow otherwise lost annotations to be recovered.

Figure 13A:
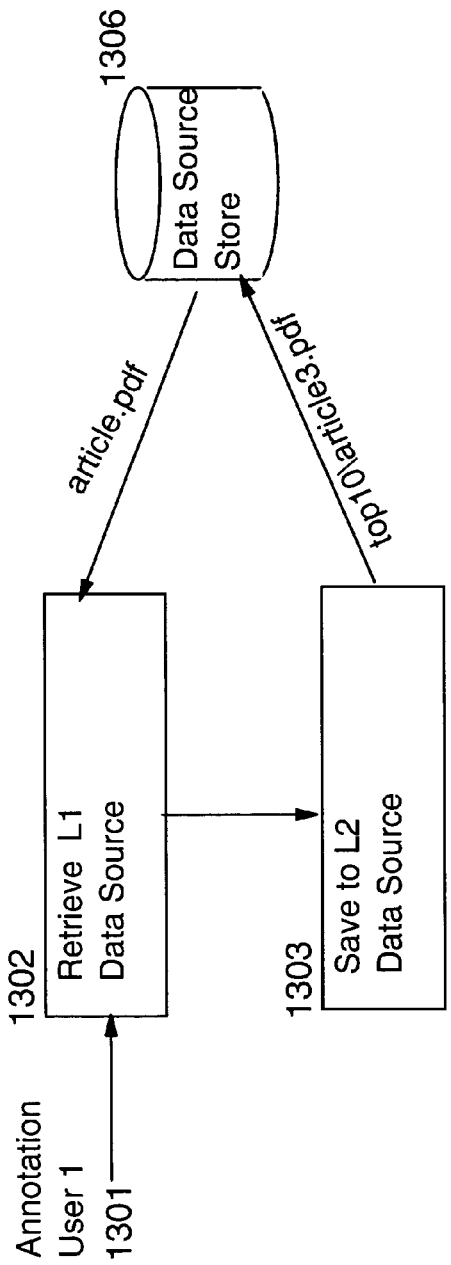
FIG. 13 illustrates recovering otherwise lost data source via digital fingerprint when the annotation system is aware that a data source has been moved to a new location.
Figure 13B:
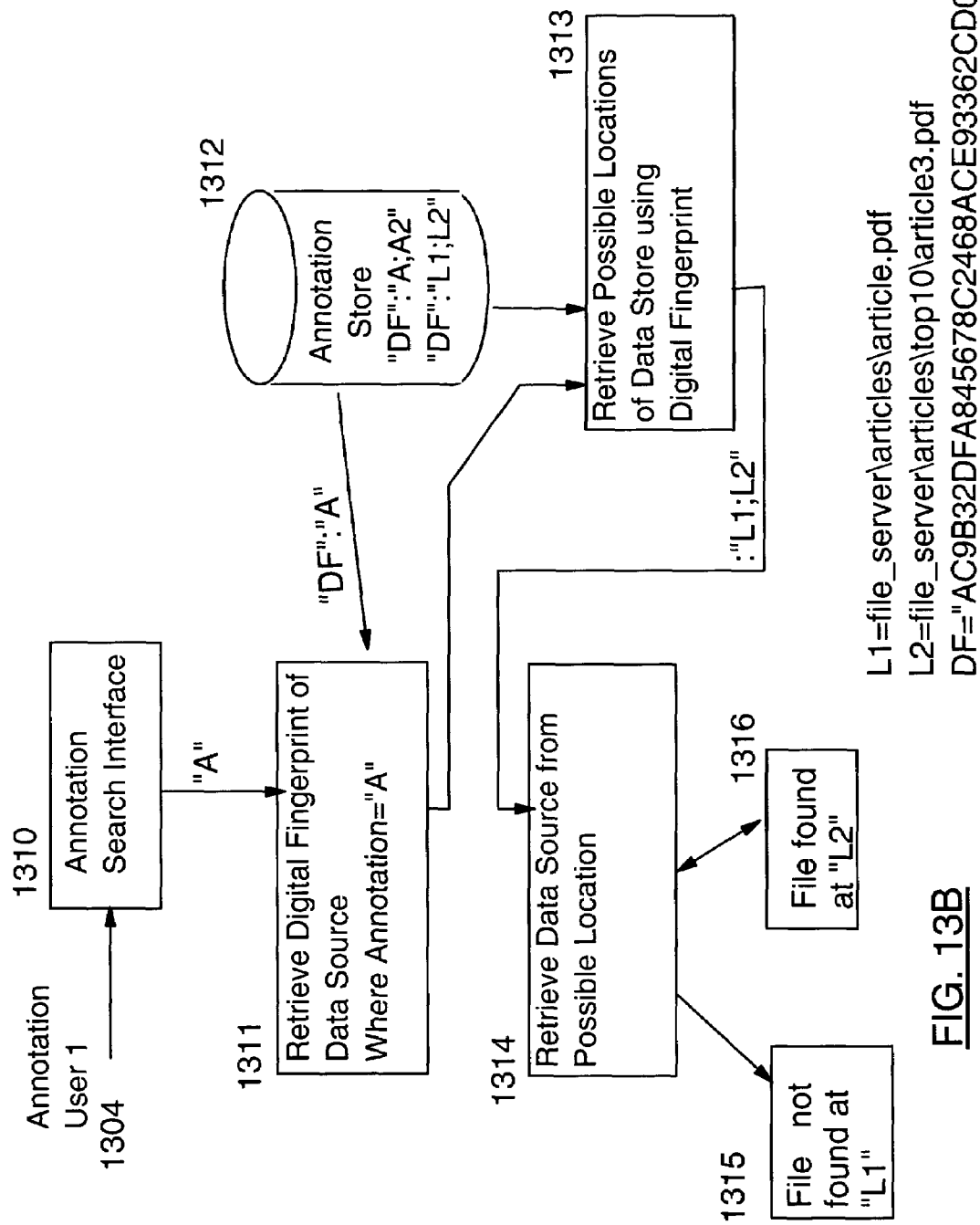

In one embodiment of the system (FIGS. 13A-13B), a second user 1301 retrieves a file F1 1302 from a location L1 and saves it 1303 as F2 at location L2 and deletes F1 from L1. An annotation user 1304 retrieves annotation "A" via an external search 1310 or browser mechanism, and wishes to locate the annotation's target data source. The annotation store is queried 1311 for the digital fingerprint "DF", related to annotation "A", and then checks the one-to-many relationship for a list of locations L1, L2 at which the data source with fingerprint "DF" can be found. Each of these locations is checked for the presence of a data source with fingerprint "DF"; if such a data source is found, the user may now work with both the annotation and its target data source.

Figure 14A:
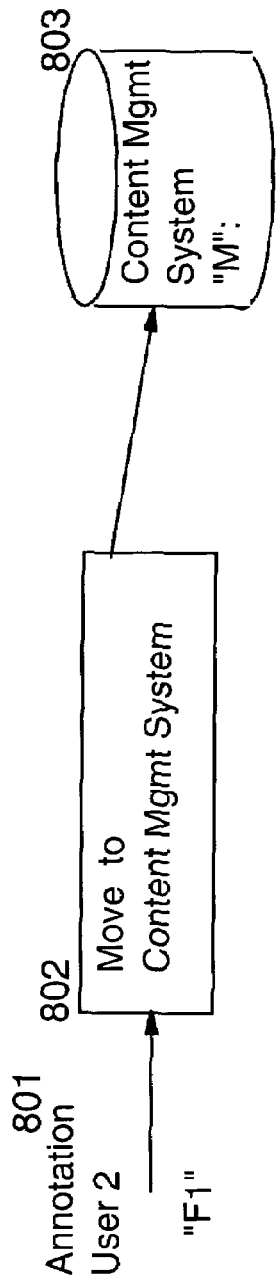
FIG. 14 illustrates recovering a lost data source via a search keyed on a digital fingerprint.
Figure 14B:
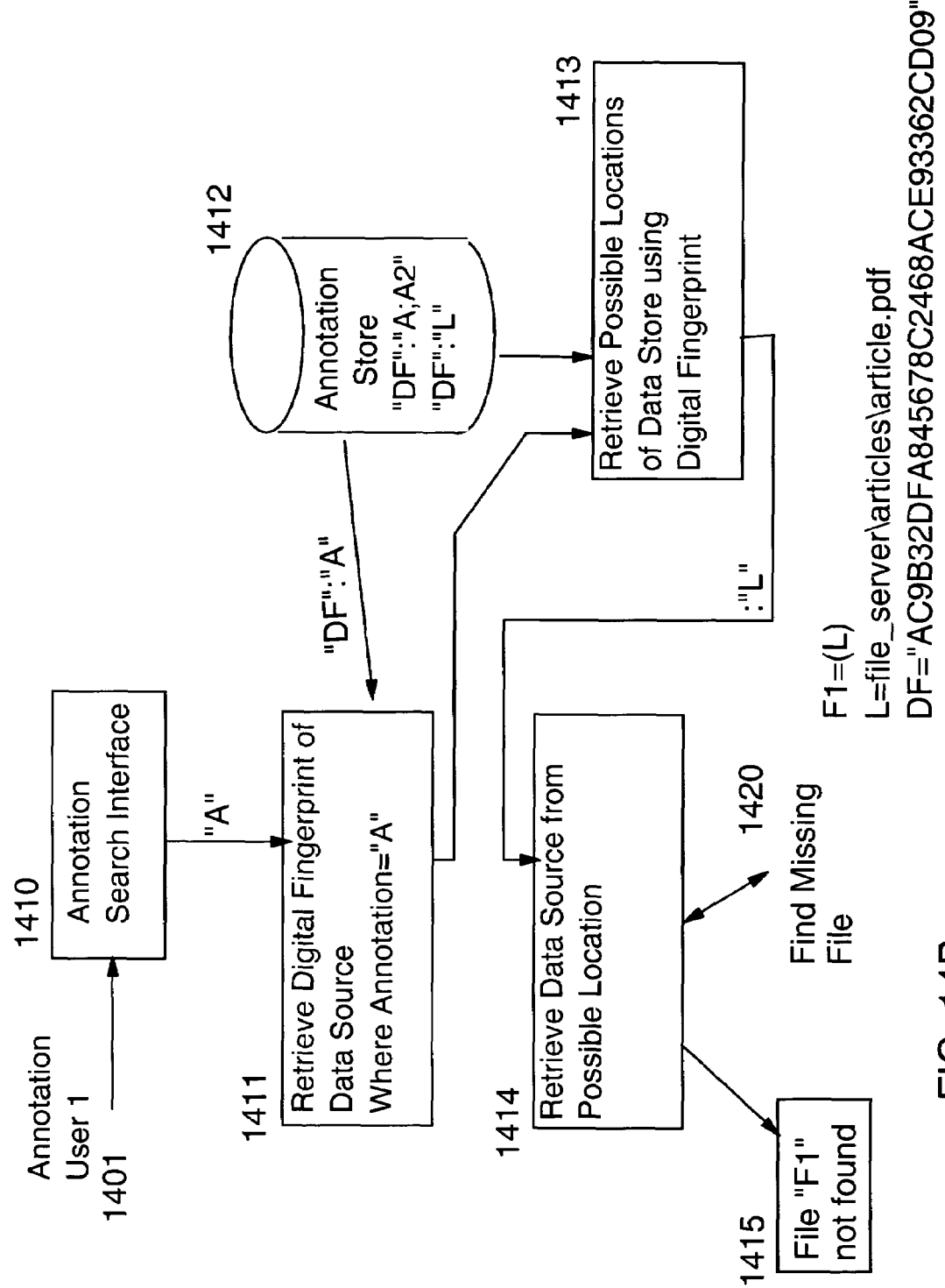
Figure 14C:
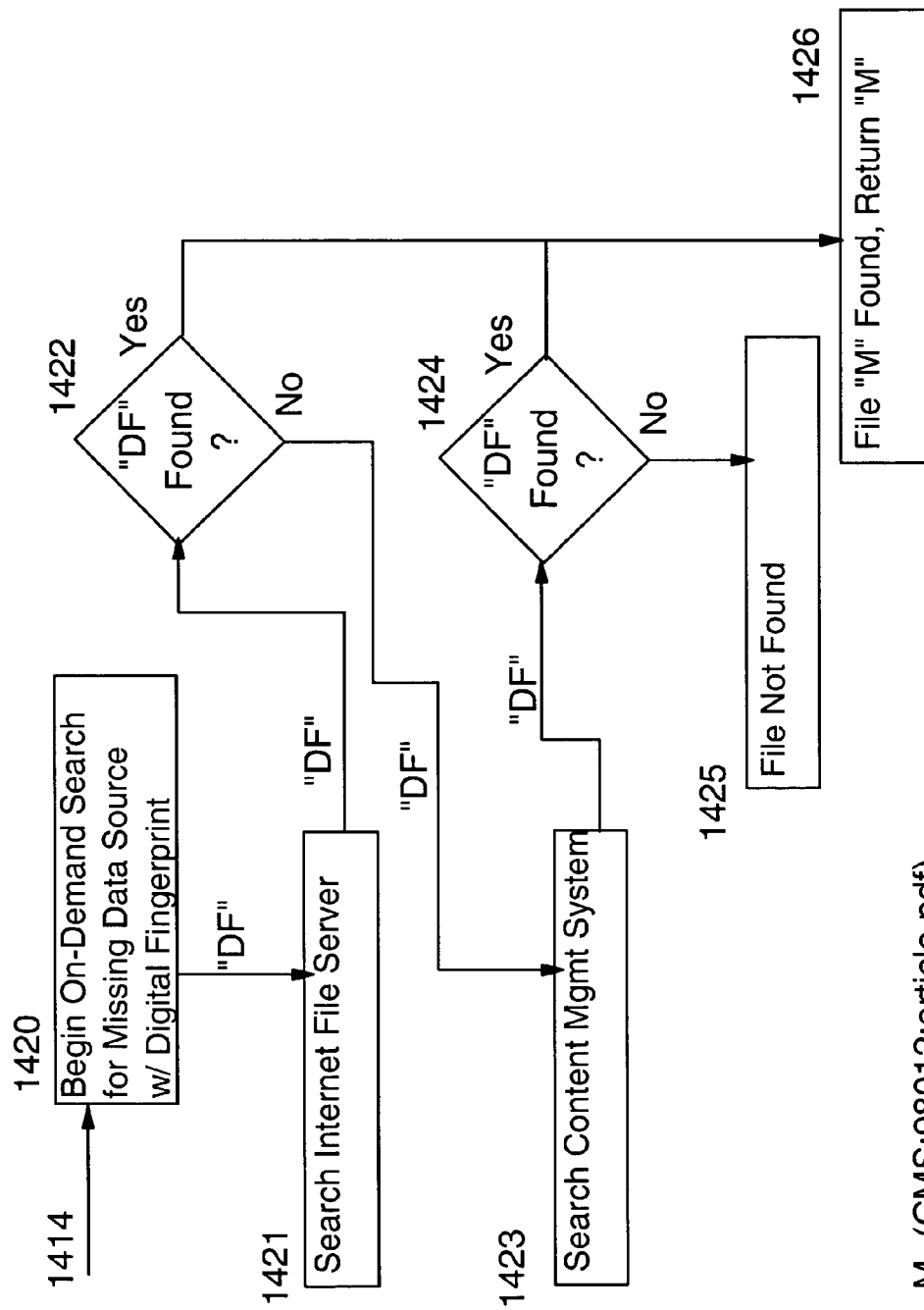

In another embodiment (FIGS. 14A-14C), the data source no longer exists at any locations recorded in the annotation store as related to "DF". (For example, "DS" may have been moved 802 to an archive file server 803 via a mechanism that is outside of the annotation system.) The annotation system is configured with a finite universe of possible data source locations. Such locations might include the root of a network file server in which directory lists are obtainable, the root of an intranet web server that may be traversed via hyperlinks, or a content-management system (which is a finite universe of data source locations in and of itself).

In one embodiment of the system, the search process may be invoked on-demand to recover a lost data source with fingerprint "DF". A user 1401 initiates a search through an annotation search interface 1410. The Annotation Store 1412 is queried 1411 for the digital fingerprint "DF" associated with an Annotation object "A". The system uses the digital fingerprint to retrieve 1413 the possible locations "L" of data sources having the digital fingerprint. If the data source is not found, the configured universe of possible data source locations is searched for a data source with a fingerprint of "DF". If the data source exists anywhere within the search universe, the deterministic, computable nature of a digital fingerprint will guarantee that it will be found, and the user will then be able to work with both the annotation and its target data source. In addition, the relationship between "DF" and the location at which the data source is found can be recorded in the annotation store. The digital fingerprint is used by the on-demand search system 1420 to search the configured universe (internet file server 1421 and content management system 1423). If the file is found 1426 the location and digital fingerprint are recorded in the annotation store 1412.

Figure 15:
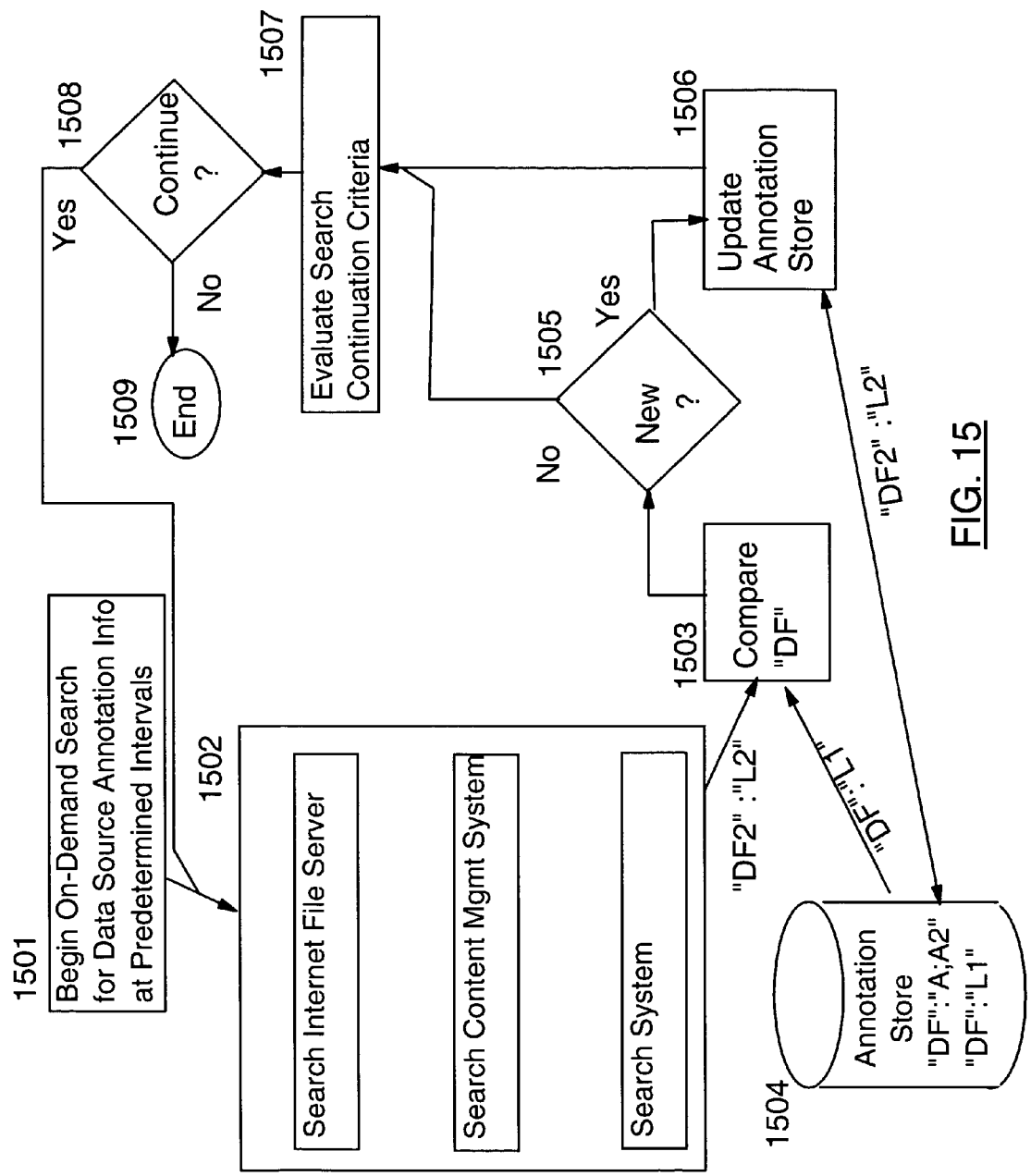
FIG. 15 illustrates a continual search process to expand the annotation store's fingerprint-to-location relationship.

In an alternative embodiment of the system (FIG. 15), the search process may run at regular intervals, continually expanding the one-to-many relationship of digital fingerprints to locations. In this case, even data sources that are moved outside of the knowledge of the annotation system will not be lost when an annotation is retrieved via an external search or browser mechanism. Thus the addition of digital fingerprinting along with the one-to-many fingerprint-to-location relationship and an on-demand or continual search process eliminates the second shortcoming of a traditional annotation system: our invention allows otherwise lost target data sources to be recovered.

The "on-demand" search process begins 1501 and a search is performed on predetermined data stores 1502 outside the local annotation system according to a predetermined plan. Preferably, temporary digital fingerprints are created for data stores found. If 1505 the temporary digital fingerprint DF2 matches 1503 a digital fingerprint in the local annotation store 1504 DF:L1, the location L2 associated with the data store found is added to the DF:L1 of the local annotation store 1504 resulting in the relationship DF:L1;L2. The search continuation a criterion is evaluated 1507 according to a predetermined plan and if the criterion is met, the search continues, otherwise, the search is ended 1508. An example continuation criterion is to perform the search continually during a predetermined period of time (background mode) and another criterion would target certain databases more frequently than others, another criterion would alert a user that the search was proceeding at certain intervals requesting the users' permission to continue or abort.

In one embodiment, the compare step 1503 creates a digital fingerprint for a remote file 1502 and searches the local annotation store 1504 for a match. If 1505 the same fingerprint is found (DF=DF2) in the annotation store, the location of the remote file L2 is added to the annotation store 1504 as DF:L1;L2.

Figure 16:
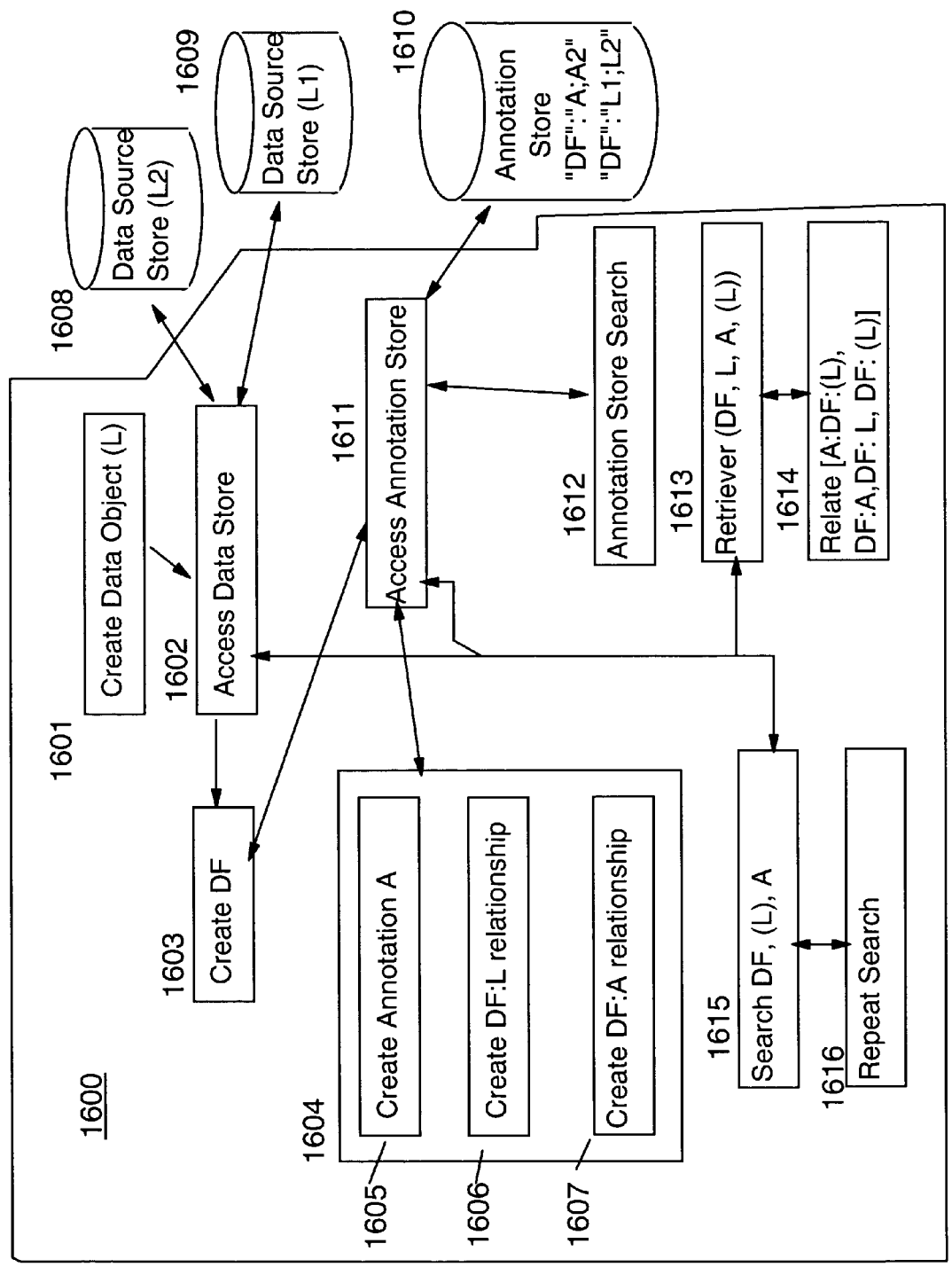
FIG. 16 illustrates the components of the system of the invention.

Referring to FIG. 16, a preferred embodiment of a system for annotating a data object comprises a value creator program 1603 for creating a first digital fingerprint value (DF) of the data object 1609, the data object stored 1602 at a first location L1; an object creator program 1605, creating a first annotation object A; a first creator program 1606, creating a first relationship DF:L1, relating the first digital fingerprint value "DF" to the first location "L1"; a second creator program 1607, creating a second relationship DF:A, relating the first digital fingerprint value "DF" to the first annotation object "A"; and a saver program 1611, saving in an annotation store, any one of the first relationship DF:L1 or the second relationship DF:A.

In a variation, the value creator program 1603 creates the first digital fingerprint value from any one of the data of the object, the digital data of one or more portions of the object, the digital data of the object combined with other digital data or the digital data of the location of the object.

In another variation, the value creator program 1603 creates the digital fingerprint value using any one of a checksum algorithm, a cyclic redundancy check, a hash algorithm, the National Institutes of Standards and Technology (NIST, of the U.S. Department of Commerce) SHA-256 secure hash algorithm, the (NIST) SHA-1 secure hash algorithm or the Massachusetts Institute of Technology (MIT) MD5 message digest algorithm.

In another variation, a third creator program 1605, creates a second annotation object "A2" 904; a fourth creator program 1607, creates a third relationship, the third relationship relating the first digital fingerprint to the second annotation object DF:A2; and a second saver 1611, saves the third relationship in the annotation store1610.

In another variation, an object locater program 1602, locates the data object at a second location L2; a fifth creator program 1606, creates a fourth relationship, relating the first digital fingerprint to the second location DF:L2; and a third saver program 1611, saves the fourth relationship in the annotation store 1610.

In another embodiment, annotated data objects are accessed using an obtainer program 1603, obtaining a first digital fingerprint value DF for a data object; a finder program 1612, finds any one of a first annotation object having a relationship to the first digital fingerprint value DF:A or the data object having a relationship to the first digital fingerprint value DF:L1); and a retriever program 1613, retrieves any one of the first annotation object A or the data object (L1).

In a variation, a queryer 1615, queries an annotation store 1610 for an entry containing the first digital fingerprint value DF and a first relationship of the first digital fingerprint to any one of an annotation object DF:A or the location of the data object DF:L1.

In another variation, the obtainer program 1603 further comprises either a calculator program, calculating the first digital fingerprint value DF of the data object (L1); or a second queryer program 1615, querying an annotation store 1610 for a second annotation object A2 and the first digital fingerprint DF associated with the second annotation object DF:A2.

In another embodiment, a first retriever program 1613, retrieves at a first location 1609, a first digital fingerprint value DF of a first data object (L1), a first annotation object related to the first digital fingerprint value DF:A and a first identity of a second location 1608 related to the first digital fingerprint, the second location comprising location L2 of the data object; a second retriever program 1602, retrieves from the second location 1608, the data object (L2); and a relater program 1614, relates the first annotation object A with the data object retrieved (L) as A:(L).

In a variation, the second retriever 1602 further comprises a determiner program 1615, determining that the data object is not at the second location; a searcher program 1615, searching a second database 1608 for data objects having the first digital fingerprint; and a third retriever program 1613, retrieving the data object from a third location of the second database 1608.

In another variation, the system comprises a repeater program 1616, repeating the operation of the system according to a predetermined plan. The plan includes any one of a time period, a system activity monitor, a user GUI prompt or a program control.

In another variation, the system a recorder program 1611, recording at the first location 1610, the first relationship of the first digital fingerprint value DF and third location L2 of the data object retrieved from the second database 1608 as DF:L2.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for annotating a data object, the data object consisting of digital data, the method comprising the steps of:
   creating a first digital fingerprint value from the digital data of the data object, the data object stored at a first location;
   creating a first annotation object;
   creating a first relationship relating the first digital fingerprint value to the first location;
   creating a second relationship relating the first digital fingerprint value to the first annotation object;
   saving in an annotation store any one of the first relationship or the second relationship;
   creating a second annotation object;
   creating a third relationship the third relationship relating the first digital fingerprint to the second annotation object; and
   saving the third relationship in the annotation store.

2. The method according to claim 1 wherein the first digital fingerprint value is created from any one of the digital data of the object, digital data of one or more portions of the object or the digital data of the object combined with other digital data.

3. The method according to claim 1 wherein the digital fingerprint value is created using any one of a checksum algorithm, a cyclic redundancy check, a hash algorithm, the SHA-256 secure hash algorithm, the SHA-1 secure hash algorithm or the MD5 message digest algorithm.

4. The method according to claim 1 comprising the further steps of:
   locating the data object at a second location;
   creating a fourth relationship relating the first digital fingerprint to the second location; and
   saving the fourth relationship in the annotation store.

5. A computer program product for annotating a data object, the data object consisting of digital data, the computer program product comprising:
   a tangible storage medium readable by a processing circuit and storing instructions for execution by the processing circuit for performing a method comprising:
   creating a first digital fingerprint value from the digital data of the data object, the data object stored at a first location;
   creating a first annotation object;
   creating a first relationship relating the first digital fingerprint value to the first location;
   creating a second relationship relating the first digital fingerprint value to the first annotation object;
   saving in an annotation store any one of the first relationship or the second relationship;
   creating a second annotation object;
   creating a third relationship the third relationship relating the first digital fingerprint to the second annotation object; and
   saving the third relationship in the annotation store.

6. The computer program product according to claim 5 wherein the first digital fingerprint value is created from any one of the digital data of the object, digital data of one or more portions of the object or the digital data of the object combined with other digital data.

7. The computer program product according to claim 5 wherein the digital fingerprint value is created using any one of a checksum algorithm, a cyclic redundancy check, a hash algorithm, the SHA-256 secure hash algorithm, the SHA-1 secure hash algorithm or the MD5 message digest algorithm.

8. The computer program product according to claim 5 comprising the further steps of:
   locating the data object at a second location;
   creating a fourth relationship relating the first digital fingerprint to the second location; and
   saving the fourth relationship in the annotation store.

9. A computer system for annotating a data object, the system comprising:
   a main storage;
   one or more central processors in communications with a main storage, wherein the computer system includes instructions to execute a method comprising;
   creating a first digital fingerprint value from the digital data of the data object, the data object consisting of digital data, the data object stored at a first location;
   creating a first annotation object;
   creating a first relationship relating the first digital fingerprint value to the first location;
   creating a second relationship relating the first digital fingerprint value to the first annotation object;
   saving in an annotation store any one of the first relationship or the second relationship;
   creating a second annotation object;
   creating a third relationship the third relationship relating the first digital fingerprint to the second annotation object; and
   saving the third relationship in the annotation store.

10. The system according to claim 9 wherein the first digital fingerprint value is created from any one of the digital data of the object, digital data of one or more portions of the object or the digital data of the object combined with other digital data.

11. The system according to claim 9 wherein the digital fingerprint value is created using any one of a checksum algorithm, a cyclic redundancy check, a hash algorithm, the SHA-256 secure hash algorithm, the SHA-1 secure hash algorithm or the MD5 message digest algorithm.

12. The system according to claim 9 comprising the further steps of:
 locating the data object at a second location;
 creating a fourth relationship relating the first digital fingerprint to the second location; and
 saving the fourth relationship in the annotation store.

* * * * *